United States Patent

Hlucka et al.

(10) Patent No.: US 10,635,856 B2
(45) Date of Patent: Apr. 28, 2020

(54) CROSS TAB EDITOR WITH REVERSE EDITING CAPABILITY

(71) Applicant: HONEYWELL INTERNATIONAL INC., Morristown, NJ (US)

(72) Inventors: Martin Hlucka, Velatice (CZ); Zdenek Dvorak, Lipuvka (CZ); David Mikulka, Nedachlebice (CZ); Tim Felke, Glendale, AZ (US); Nagabhushana Rao Begur, Glendale, AZ (US); Jeff vanderZweep, Peoria, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 538 days.

(21) Appl. No.: 13/930,061

(22) Filed: Jun. 28, 2013

(65) Prior Publication Data

US 2015/0007009 A1 Jan. 1, 2015

(51) Int. Cl.
G06F 17/24 (2006.01)
G06F 40/177 (2020.01)
G06F 16/20 (2019.01)

(52) U.S. Cl.
CPC .......... *G06F 40/177* (2020.01); *G06F 16/20* (2019.01)

(58) Field of Classification Search
CPC .......... G06N 5/02; G06F 17/24; G06F 17/245
See application file for complete search history.

(56) References Cited

U.S. PATENT DOCUMENTS 5,915,257 A 6/1999 Gartung et al.
6,662,089 B2 12/2003 Felke et al.
(Continued)

FOREIGN PATENT DOCUMENTS

EP 2555114 A1 2/2013
EP 2613212 A1 7/2013

OTHER PUBLICATIONS

Premerlani, William J., and Michael R. Blaha. "An approach for reverse engineering of relational databases." Reverse Engineering, 1993., Proceedings of Working Conference on. IEEE, 1993.*
(Continued)

*Primary Examiner* — Vincent Gonzales
*Assistant Examiner* — Kevin W Figueroa
(74) *Attorney, Agent, or Firm* — Lorenz & Kopf, LLP (57) ABSTRACT

Methods, apparatus and computer readable media are provided for reverse editing a knowledge base from a cross tab display. A cross tab editor includes a knowledge base resident in a memory device, the knowledge base comprising attribute values and a knowledge base management system, wherein the knowledge base management system is configured to create a first list of sub-entities for a first entity, create a second list of sub-entities for a second entity, and create a relationship table listing all of the combinations of each pair of sub-entities from the first list and the second list and their attribute values. The knowledgebase management system is further configured to populate the relationship table with an attribute value for each combination. The knowledge base management system is further configured to receive a manual change in a cross tab display and to update the underlying attribute data in response to the change.

19 Claims, 6 Drawing Sheets

(56) References Cited

U.S. PATENT DOCUMENTS

| | | | |
|---|---|---|---|
| 6,748,304 | B2 | 6/2004 | Felke et al. |
| 6,750,864 | B1 | 6/2004 | Anwar |
| 7,260,505 | B2 | 8/2007 | Felke et al. |
| 7,739,292 | B2 | 6/2010 | Falk et al. |
| 7,823,062 | B2 | 10/2010 | Liberty et al. |
| 7,990,946 | B2 | 8/2011 | Deguchi |
| 8,019,504 | B2 | 9/2011 | Jamrosz et al. |
| 8,239,778 | B2 | 8/2012 | Sheth-Voss et al. |
| 8,264,949 | B2 | 9/2012 | Ravindran et al. |
| 8,378,853 | B2 | 2/2013 | Smith et al. |
| 8,526,311 | B2 | 9/2013 | Ballard et al. |
| 8,527,328 | B2 | 9/2013 | Grace et al. |
| 8,824,337 | B1 | 9/2014 | Geisberger |
| 8,854,953 | B2 | 10/2014 | Enyedi et al. |
| 8,913,797 | B1 | 12/2014 | Siddavanahalli |
| 2002/0124211 | A1 | 9/2002 | Gray et al. |
| 2005/0021531 | A1 | 1/2005 | Wen et al. |
| 2005/0223288 | A1 | 10/2005 | Berbaum et al. |
| 2008/0091707 | A1 | 4/2008 | Brown et al. |
| 2008/0228745 | A1 | 9/2008 | Markus et al. |
| 2008/0288525 | A1* | 11/2008 | Leikucs ............ G06F 17/30286 |
| 2009/0027392 | A1 | 1/2009 | Jadhav et al. |
| 2010/0153832 | A1 | 6/2010 | Markus et al. |
| 2011/0078188 | A1 | 3/2011 | Li et al. |
| 2012/0166489 | A1* | 6/2012 | Cheng ............... G06F 17/30592 707/797 |
| 2012/0232743 | A1 | 9/2012 | Singh |
| 2012/0232905 | A1 | 9/2012 | Rajpathak et al. |
| 2012/0303662 | A1 | 11/2012 | Tewari et al. |
| 2012/0317149 | A1 | 12/2012 | Jagota et al. |
| 2013/0225200 | A1 | 8/2013 | Ben Hamida et al. |
| 2013/0246439 | A1 | 9/2013 | Liekens et al. |
| 2013/0254213 | A1 | 9/2013 | Cheng et al. |
| 2014/0129551 | A1 | 5/2014 | Markus et al. |
| 2014/0214855 | A1 | 7/2014 | Attaluri et al. |
| 2014/0279189 | A1* | 9/2014 | Kubicki ............. G06Q 30/0631 705/26.7 |
| 2014/0331156 | A1 | 11/2014 | Kulikov |
| 2014/0337306 | A1 | 11/2014 | Gramatica |

OTHER PUBLICATIONS

Data, C. J. An introduction to database systems. Addison-Wesley publ., 1975.*

New book: Microsoft Excel 2010 Formulas & Functions Inside out Dec. 23, 2011 Retrieved Feb. 21, 2017 [https://blogs.msdn.microsoft.com/microsoft_press/2011/12/23/new-book-microsoft-excel-2010-formulas-functions-inside-out/].*

Qualtech Systems Website; TEAMATE; [Retrieved from Internet www:teamqsi.com/products/teamate] Sep. 12, 2013.

Extended EP Search Report for EP 15155261.9-1958 dated Feb. 6, 2015.

Extended EP Search Report for EP 1519300.1-1952 dated Aug. 25, 2015.

USPTO Office Action, dated Dec. 18, 2015; U.S. Appl. No. 14/231,472.

Gray J et al: "Data cube: a relational aggregation operator generalizing Group-By, Cross-Tab, and Sub-Totals", Data Engineering, 1996, Proceedings of the Twelfth International Confe Rence n New Orleans, LA, USA Feb. 26-Mar. 1, 1996, Los Alamitos, CA USA, IEEE Comput. Soc, US, Feb. 26, 1996, pp. 152-159, XP010158909, DOI: 10.1109/ICDE.1996.492099 ISBN: 978-0-8186-7240-8.

EP Extended Search Report for Application No. EP 14172777.6 dated Dec. 18, 2014.

USPTO Office Action for U.S. Appl. No. 14/231,472; dated Jun. 2, 2016.

EP Examination Report for Application No. 15159300.1-1952 dated Jul. 14, 2016.

USPTO Notice of Allowance for U.S. Appl. No. 14/194,058 dated Dec. 22, 2016.

USPTO Office Action for U.S. Appl. No. 14/231,472 dated Dec. 16, 2016.

USPTO Office Action for U.S. Appl. No. 14/194,058 dated Jul. 15, 2016.

EP Examination Report for Application No. 15155261.9-1958 dated Feb. 15, 2017.

Department of Defense, et al. "MIL-STD-1309D: Definitions of Terms for Testing, Measurement and Diagnostics", Feb. 12, 1992, XP055343631, URL:http://www.product-lifecycle-management.com/download/MIL-STD-1309D.pdf (retrieved on Feb. 8, 2017).

USPTO Office Action for U.S. Appl. No. 14/231,472 dated Jun. 6, 2017.

USPTO Advisory Action for U.S. Appl. No. 14/231,472 dated Sep. 8, 2017.

USPTO Office Action for U.S. Appl. No. 14/231,472 dated Sep. 22, 2017.

EP Annex to Summons to Oral Proceedings for Application No. 15159300.1 dated Aug. 7, 2017.

USPTO Final Office Action for U.S. Appl. No. 14/231,472 dated Apr. 20, 2018.

EP Decision to Refuse European Application No. 15159300.1 dated Jan. 29, 2018.

* cited by examiner

CROSS TAB EDITOR WITH REVERSE EDITING CAPABILITY

TECHNICAL FIELD

The present invention generally relates to methods and systems to manage data base editing, and more particularly relates to a novel system providing reverse editing capability from a cross tab graphical user interface.

BACKGROUND

Database management becomes a task of ever increasing complexity as the volume of data contained in a database grows. Demands for precision data mining ability for that data also grows. Data is useless if it cannot be located and accessed in an efficient manner Efficiently displaying, modeling, reviewing and editing of relationships in a database between different data types has been exceedingly difficult. An entity type is data representing one particular set of data or entity (e.g., a data table in a database). Entity Types can be thought of as common nouns and entities can be thought of as proper nouns. Examples: a computer, aircraft, navy ship, automobile, tank, engine, an employee, a song, a mathematical theorem. A "relationship" is data indicating how one entity data type is related to another. Such data about the relationship data is metadata. Relationship metadata is the collection of relationship specifications that have been defined for the system.

An "entity" is a specific physical data table structure grouping of a set of data elements that have a repeatable set of properties. Non-limiting examples of "entities" for a maintenance database may include component functions, component failure modes, failure mode symptoms and repairs for failure modes.

A relationship captures how entities are related to one another. Relationships can be thought of as verbs, linking two or more nouns. Examples: An aircraft has engine relationship that links aircraft to its engine. An "aircraft" may have a failure modes relationship that links the aircraft and all of its related failure modes. A failure mode may have symptom relationships that link a failure mode to symptoms of a failure mode. A recursive relationship is one in which the same entity participates on both sides of the relationship. Additional information concerning entities, relationships and attributes are discussed further in co-owned, co-pending patent application Ser. No. 13/794,155, which is incorporated herein by reference in its entirety.

Conventional approaches for displaying and managing entities of various data types, and managing the relationships between them, are cumbersome and redundant. Moreover, because a relationship can carry additional significant data values in and of themselves (i.e., relationship attributes), any relationships between two entities necessarily become a three dimensional relationship (including the relationship) that is difficult to perceive and edit. When a relationship between any two entities (e.g., Entities A and B) is desired to be reported or the relationship between them is to be modified, only a single two-dimensional rendering of the relationship can be generated. If a relationship between two other entities (Entities B and D) is also desired only a second two dimensional rendering (i.e., a cross tab) can be generated. The same situation presents itself when relationships between any two entities include multiple parameters or values (i.e., attributes). In that case multiple different renderings must be generated for each combination and/or permutation of entities and their attributes. Further, to the extent that new relationships or relationship attributes need to be added to the knowledgebase, each data table the knowledge base must be updated and amended directly, which is also cumbersome and time consuming It should be noted that while commercial spreadsheet applications such as Excel® sold by Microsoft Inc. of Redmond, Wash. create crosstab displays such as a two variable data table or a pivot table, the information contained in the cells of the table is static. The static data is not data driven or equation driven. Directly changing the content of a data table or a pivot table is ineffective because there is no mechanism to reverse edit a relationship table in the knowledge base from the cross tab display. Reverse editing as used herein is the ability to edit the underlying data tables directly by changing, adding or deleting symbols in a cell of a cross tab display. Conventionally, a user may create a special relationship table but there is still no means for reverse editing it from the cross tab display. The relationship attributes in the cross tab display must be edited elsewhere in order to get an updated cross tab display.

Hence, there is a need for systems and methods to allow database system users to perceive and edit multidimensional relationships amongst data entities. Additionally, there is a need for a reversely editable graphical user interface (GUI) rendered on a display screen of a computing device that allows users to intuitively edit various data structures within a data base by manipulating data cells in the reversely editable GUI.

BRIEF SUMMARY

An electronic cross tab editor configured to reverse edit a knowledge base is provided for. The electronic cross tab editor comprises a knowledge base of application data resident in a memory device, the application data comprising attribute values and a knowledge base management system executing in a computing device, the computing device in operable communication with the memory device. The knowledge base management system is configured to create a first list of sub-entities for a first entity, create a second list of sub-entities for a second entity, and create a relationship table listing all of the combinations of each pair of sub-entities from the first list and the second list. The knowledge base management system is further configured to populate the relationship table with an attribute value for each combination, render a cross tab display on an electronic display device that displays the first list and the second list, and populate a cell of the cross tab display from the relationship table with a symbol representing the attribute value.

A method for creating a cross tab display and reverse editing data in a knowledgebase memory device is provided for. The method creates a first list of sub-entities for a first entity, creates a second list of sub-entities for a second entity, and creates a relationship table listing all of the combinations of each pair of sub-entities from the first list and the second list. The method then populates the relationship table with an attribute value for each combination, renders a cross tab display on an electronic display device that displays the first list and the second list, and populates a cell of the cross tab display from the relationship table with a symbol representing the attribute value.

A non-transient computer readable medium (CRM) is provided for. The CRM contains instructions that when executed in a computing device create a cross tab display that can reverse edit data in a knowledgebase. The instructions comprise creating a first list of sub-entities for a first entity, creating a second list of sub-entities for a second entity and creating a relationship table listing all of the combinations of each pair of sub-entities from the first list and the second list. The instruction further comprise populating the relationship table with an attribute value for each combination, rendering a cross tab display on an electronic display device that displays the first list and the second list, and populating a cell of the cross tab display from the relationship table with a symbol representing the attribute value.

Furthermore, other desirable features and characteristics of the [system/method] will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Those of skill in the art will appreciate that the various illustrative logical blocks, modules, circuits, and algorithm steps described in connection with the embodiments disclosed herein may be implemented as electronic hardware, computer driven software, or combinations of both. Some of the embodiments and implementations are described above in terms of functional and/or logical block components (or modules) and various processing steps. However, it should be appreciated that such block components (or modules) may be realized by any number of hardware and/or firmware components configured to perform the specified functions. To clearly illustrate this interchangeability of hardware and computer driven software, various illustrative components, blocks, modules, circuits, and steps have been described infra generally in terms of their functionality. Whether such functionality is implemented as hardware or computer driven software depends upon the particular application and design constraints imposed on the overall system. Skilled artisans may implement the described functionality in varying ways for each particular application, but such implementation decisions should not be interpreted as causing a departure from the scope of the present invention. Steps and processes in a method may be combined, separated and their order reasonably rearranged without departing from the scope of this disclosure. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

Figure 1:
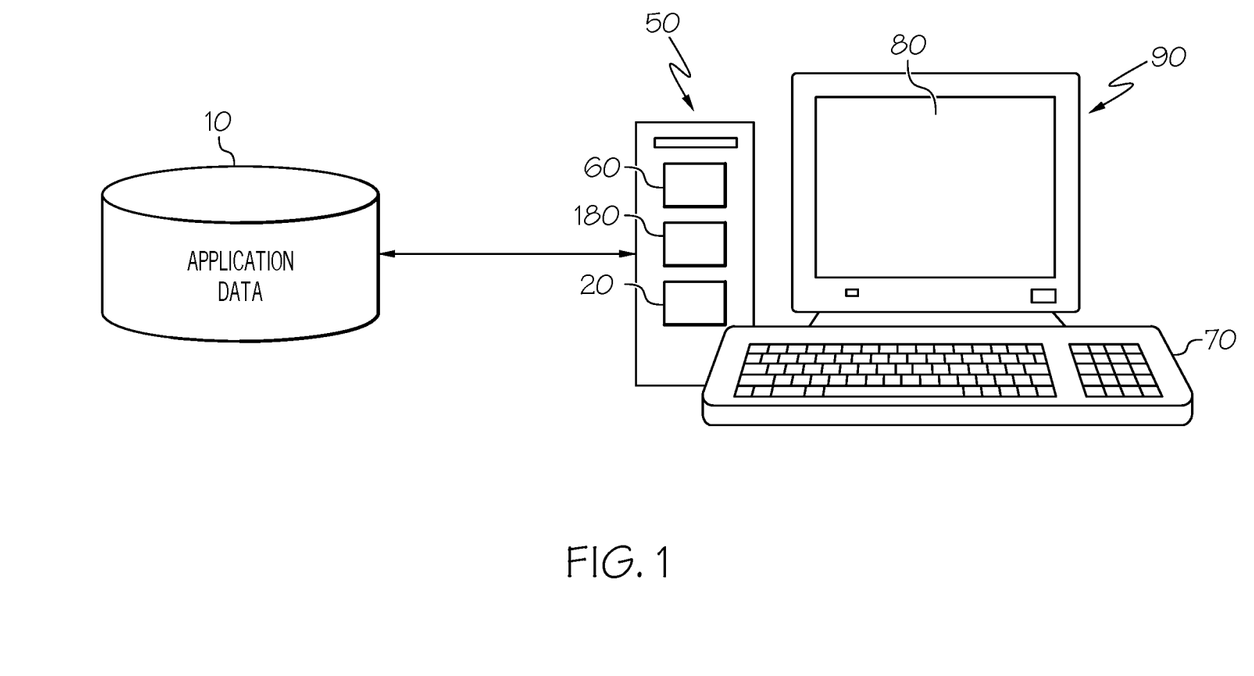
FIG. 1 is a simplified rendition of a system that may contain and execute a knowledge management system.

FIG. 1 is a block diagram of a simplified computer system commonly used to store and use a data database 10 containing application data and a Knowledge Management System (KMS) 20. The database 10 may reside in any suitable storage media known in the art or that may be developed in the future. The database 10 may reside anywhere on a network or may reside in a local computing device 50 operating a processor 60. The processor 60 operates the KMS 20 that may access, change or otherwise manipulate the database 10 using a user interface device 70, which may be a keyboard, a joy stick, a mouse, trackball or any other user interface device known in the art or the may be used in the future. The computing device may be any computing device known in the art or that may be developed in the future. Non-limiting examples of computing devices may be desktop computers, laptop computers, cell phones, projectors and handheld personal computing devices of all types.

A database user may access the database 10 by utilizing a graphical user interface 80 that is displayed on a display device 90. The display device 90 may be any display device known in the art or that may be developed in the future. Non-limiting examples of a display device may be a cathode ray tube display, a plasma display, an LCD display, and a hologram. The GUI may take the form and functionality of a crosstab editor.

Cross tabulated (or cross tabbed) data is a data rendering that is useful for showing a visual comparison of two or more data sets to determine how they are interrelated. In statistical terms, it is a joint distribution between two (or more) discrete variables such as product usage and demographics. In other disciplines a mere indication of interrelationship is the purpose for the crosstab.

Figure 2:
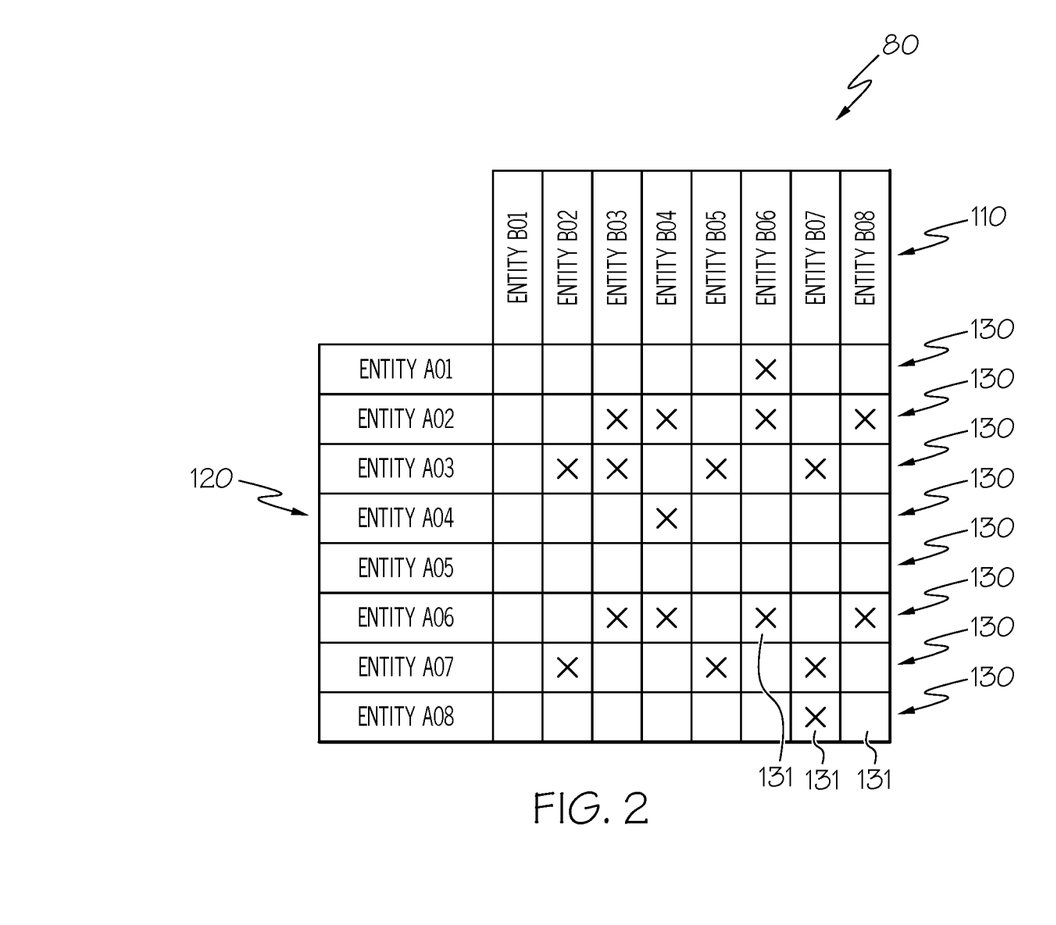
FIG. 2 is a simplified cross tab display.

FIG. 2 illustrates a conventional two dimensional crosstab GUI 80. The crosstab displayed includes a first list of entities 110 along the axis and a second list of entities 120 along the ordinance. In the illustrated example, the axis list is a list of sub-entities (B1-B8) for entity type B and the ordinance list is a list of sub-entities (A1-A8) for entity type A. The body of the crosstab display 130 includes multiple cells (A8×B8) 131 in which values or symbols indicate a relationship attribute exists between a sub-entity of entity type A with a sub-entity of entity type B.

Crosstab displays are not new. Excel® and Access® applications sold by Microsoft Inc. of Redmond Wash. and other spreadsheet applications create and display crosstabs and pivot tables generated from application data. However, such conventional crosstabs and/or pivot tables display cell values/symbols that are merely static data and are not reversibly editable. By "reverse editable" it is meant for purposes discussed herein that a user may manipulate a cell (e.g., A01, B06) to directly change the data or the relationship attribute in the cell and thereby add, delete or modify the underlying data tables or relationships between data in the data tables stored in memory 30.

Figure 3:
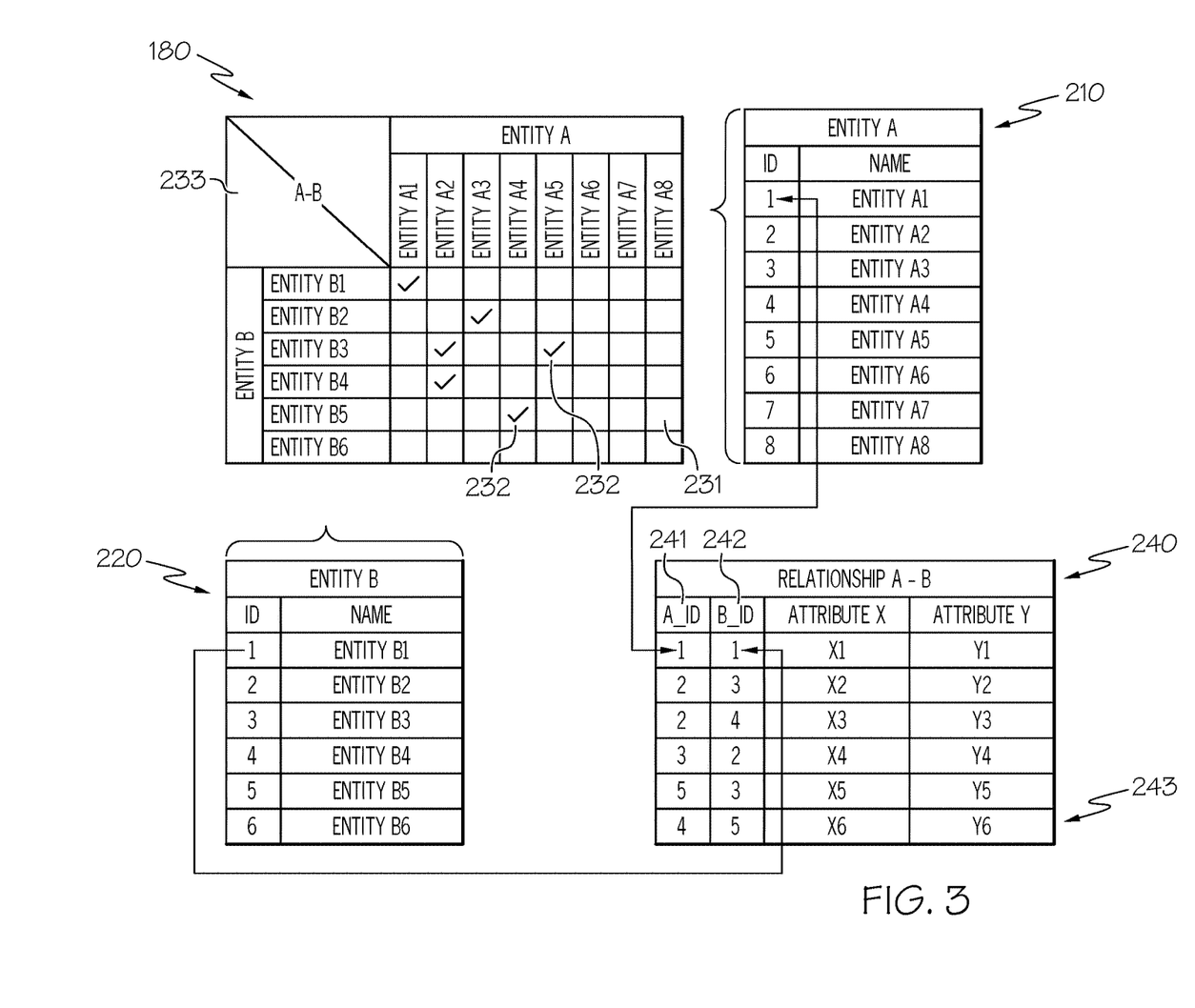
FIG. 3 is an exemplary rendition of a cross tab editor according to embodiments.

FIG. 3 is a relational diagram of a simplified crosstab GUI 180 and its associated parts/relationships according to embodiments disclosed herein. By using a database modeling tool (not shown) as may be known in the art, a user may model or structure the cross tab editor 180 to access a database 10, retrieve data entities (e.g., 210, 220) and retrieve any attribute values associated with some subject matter of interest. An exemplary database modeling tool is the Knowledge Maintenance System (KMS) owned and operated by Honeywell, Inc. of Morristown, N.J.

Once retrieved, the attributes 140 for each combination of entities (210, 220) are correlated and results are displayed in the body 230 of the cross tab editor 180. Where there are common attributes between entities, a numeric value or some other symbology (e.g., a check mark, star, bullet) is generated and displayed in the cross tab joint cell 232 associated with both of the entities. An indication of a relationship 233 between the two entities (210, 220) may also be generated. Where there are no relationships, the joint cells 232 are blank.

Figure 4:
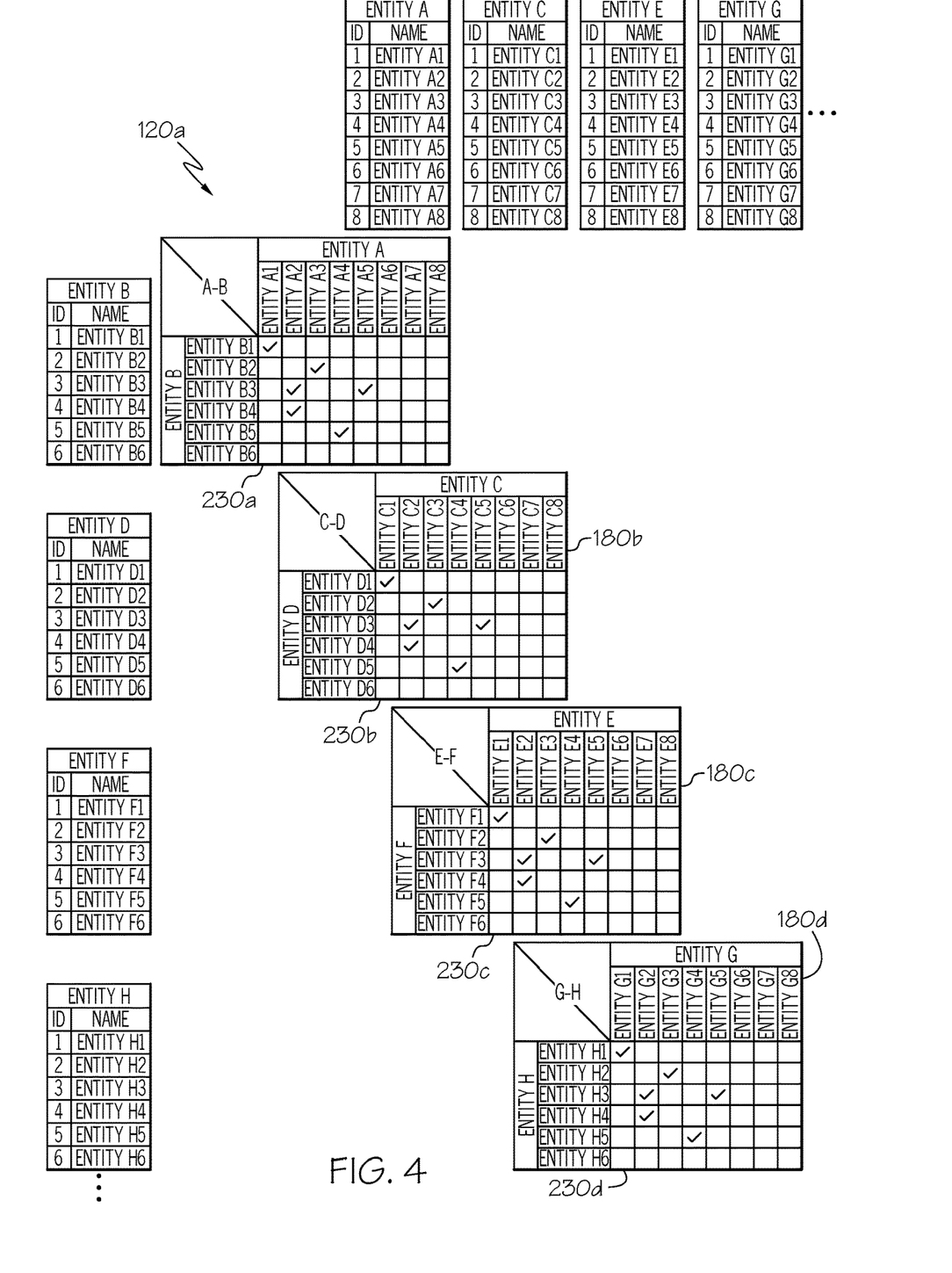
FIG. 4 is an expanded exemplary drawing illustrating multiple related entities of a complex system.

As can be understood from FIG. 3, the cross tab editor 180 (see, FIG. 1) is modeled to retrieve and display all of the entities (210, 220) that have relationship attributes X and Y and place them into attribute table 240. For every combination of entities that share both attribute X and attribute Y, for example, an indication of the relationship attribute is placed in the appropriate joint cell 232 of the body 230 of the cross tab editor 180. In the simple example of FIG. 3, entity combinations (A1,B1), (A2,B2), (A2,B4), (A3,B2), (A5, B3), and (A4,B5) all have a relationship attribute X and attribute Y. Other entities with any number of combinations and/or permutations of attributes may similarly be associated and generate their own crosstab editor 180 (See, e.g. FIG. 4).

Figure 5:
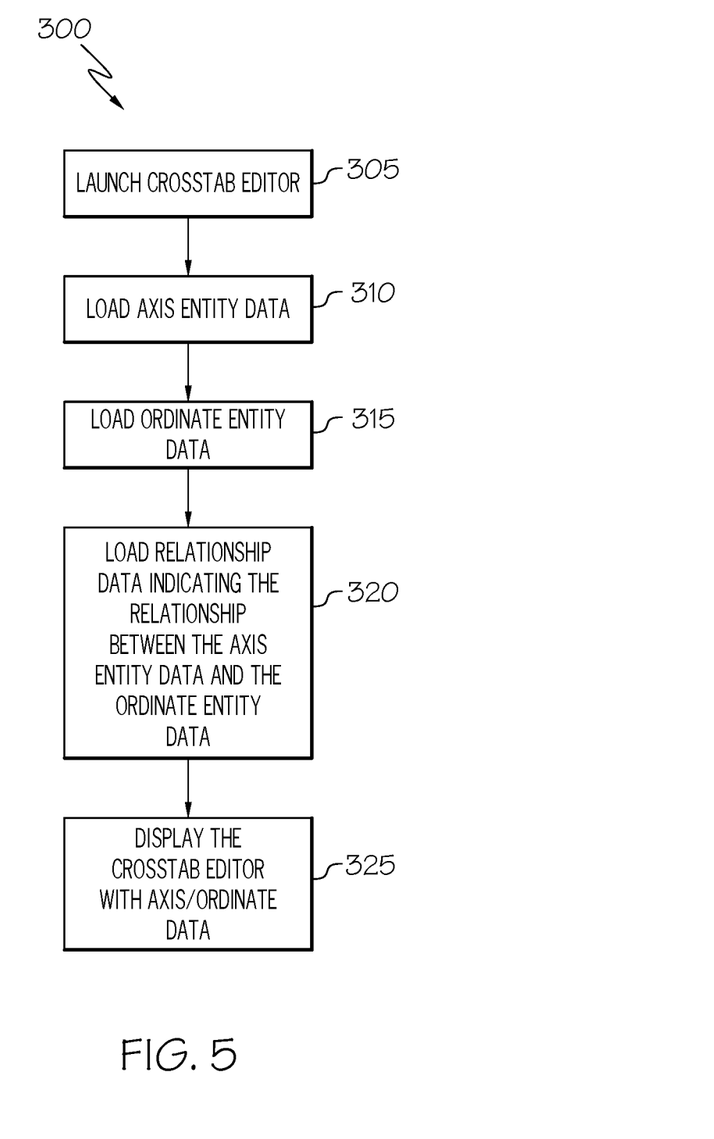
FIG. 5 is a method for creating the cross tab display.

FIG. 5 is a simplified flow diagram of a method 300 creating a crosstab editor 180. At process 305, the crosstab editor 180 application is launched by a user who uses a modeling tool (not shown) to stipulate what the axis entity data is desired to be viewed/edited and what ordinate entity data is desired to be reviewed/edited. Because the subject matter of concern may be complex and the specific entities of concern may be many, the user may utilize any number of graphical user interfaces to accomplish data identification. As a result, the number of combinations and permutations of entities resulting in separate crosstabs may be manifold (See, e.g., FIG. 4). For simplicity and clarity of explanation, the remaining description will assume only two sets of entity data, although a three dimensional cross tab is contemplated herein.

At process 310, the crosstab editor loads the chosen axis entity data 210. At process 315, the crosstab editor loads another chosen ordinate entity data 220. At process 320, relationship attribute data that indicates any relationship between the axis entity data 210 and the ordinate entity data 220 is retrieved, and relationships between entity data sets is determined and a relationship table 240 created for each combination of entities (See, FIG. 3).

At process 325, a crosstab editor 180 is generated depicting relationships between entity data sets by placing editable values, deletable symbols or other modifiable alphanumeric/graphical symbols in a joint cell 232 that indicates the relationship (See, e.g., FIG. 3). For example, if entity A2 and entity B4 have a data attribute in common, then an alphanumeric/graphical indicator appears in the joint cell 232 indicating the intersection of row B4 and column A2.

Figure 6:
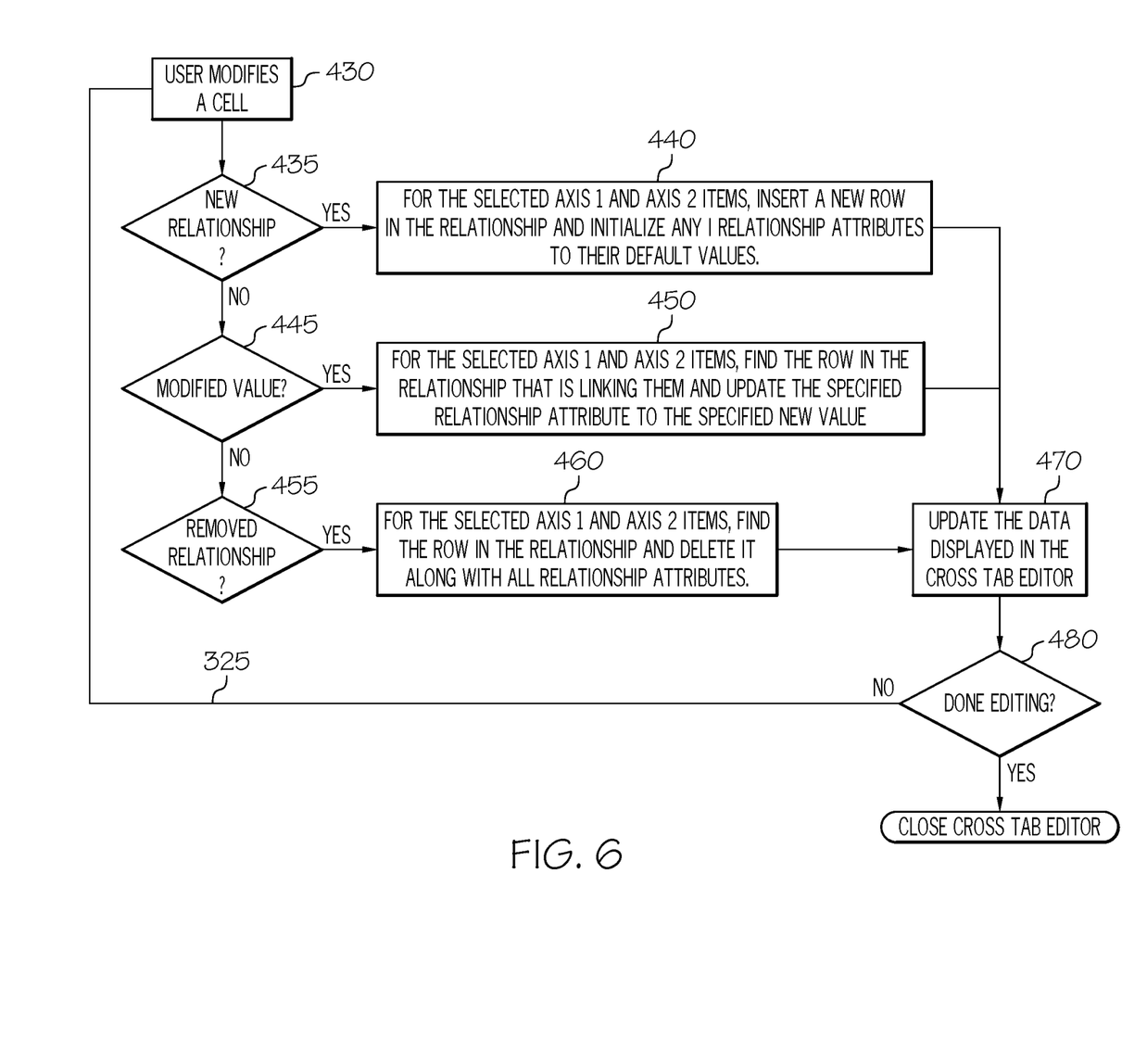
FIG. 6 is a flow chart for a method for reverse editing a relationship table in a database.

FIG. 6 is a simplified process flowchart for editing a database from a cross tab editor display. Once the editable cross tab editor 180 is created and populated at process 325 (See, FIG. 5), a user can modify the underlying relationship data related to a particular cell by adding or deleting an alphanumeric/symbol character in the cell (e.g., a check mark) or by changing a number value at process 330.

It should be noted that a trigger event telling the KMS 20 to begin the underlying editing process may be any conventional trigger event known in the art. Non-limiting, exemplary triggering events include the user cursoring away from the edited cell, it may be clicking on the ubiquitous "save" icon or the "refresh" icon, or it may be clicking on a custom icon established elsewhere in the display.

Once a user modifies a cell 231 in the cross tab editor 180 and the trigger event occurs, the method then determines if a new relationship has been created, a value has been modified, or a relationship has been removed at decision points 435, 445, and 455, respectively. The order of decision presented in FIG. 6 is illustrative and is not meant to be limiting in any fashion.

When a new relationship is established by placing a symbol in a formerly empty cell 231, the KMS 20 accesses the relationship table 240 and creates a new row 243 (See, FIG. 3) in the table 240. The KMS 20 adds the entity A_ID 241 and B_ID 242 (See, FIG. 3) associated with the edited cell and then initiates or populates the entity attributes $(X_a, Y_b)$ 243 associated with the relationship for the new entity combination. The display is then updated at process 470. When a relationship is deleted at process 455 by removing symbol from its cell 231, the KMS then locates the row in the relationship table 240 with the corresponding A_ID and B_ID and deletes it from the appropriate knowledge base table.

In lieu of graphical symbols, the cross tab editor may also display numeral in its cell(s) 231. The numerals may denote the number of times an attribute $(X_a, Y_b)$ occurs or has occurred in a complex system for entity B3 and entity A3, for example. An example may be the number of times that a particular casualty symptom occurs for a particular failure mode. When a numeral is changed (but the cell is not empty), the KMS locates the row in the relationship table 240 and updates the associated attribute stored in memory (e.g., See, FIG. 3—$X_1$ for (A_ID 1; B_ID 1)).

It should be noted that in some embodiments the relationship entity data may be entered by manual input. For example, a technician may transcribe casualty counts into the knowledge base from paper reports or from log pages. However, in other embodiments, entity relationship data is received directly from the output of sensor devices 55 and the sensor devices may be programmed by the KMS 20. An example of such a system is the heath maintenance system disclosed in the co-owned, co-pending application Ser. No. 13/016,601, which is incorporated herein by reference in its entirety.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for implementing a processer programmed to execute an electronic cross tab editor and to reverse edit a knowledge base comprising:

- a knowledge base of application data resident in a memory device, the application data comprising attribute values wherein the attribute values are derived from sensor device output; and
- a knowledge base management system executing by instructions of the processor disposed in a computing device, the processor disposed in the computing device in operable communication with the memory device, wherein from the application data the knowledge base management system is configured to:
- create, by the instructions to instruct the processor, a first list of sub-entities for a first entity,
- create, by the instructions to instruct the processor, a second list of sub-entities for a second entity,
- create, by the instructions to instruct the processor, a relationship table listing of all combinations of each pair of sub-entities from the first list and the second list, wherein the relationship table is linked to an underlaying table for a particular combination,
- render, by the instructions to instruct the processor, an editable cross tab display on an electronic display device that displays the first list, the second list, and the relationship table, wherein the editable cross tab display displays a cell which comprises: a reverse editable symbol for each particular combination between the first list and the second list in the relationship table,
- populate, by the instructions to instruct the processor, the cell of the relationship table with the reverse editable symbol configured for reverse editing an underlying data table, wherein the reverse editable symbol represents an existence of a relationship defined by common attributes between a first sub-entity associated with the cell and a second sub-entity associated with the cell, and
- perform, by the instructions to instruct the processor, a reverse editing action to modify an underlying relationship data related to the cell by a manual action to enable the reverse editing action by changing the reverse editable symbol associated with the cell, which in turn changes the underlying relationship data of each associated sub-entity of the underlying data table in the relationship table, wherein a set of underlying relationship tables is associated with each relationship in the relationship table, wherein by the manual action in the underlying relationship table of populating a checkmark in a cell, the underlying relationship data associated with the reverse editable symbol is applied to an appropriate pair of sub-entity combinations associated with the cell resulting in data of the relationship table being changed in accordance with changes of the underlying relationship data of the pair of sub-entity combinations, wherein the changes of the underlying relationship data have been triggered by the manual action of the checkmark in the cell of the relationship table, the reverse editing further comprising:
- retrieving, by the instructions to instruct the processor, the relationship data related to the cell comprising: attribute data by an axis entity data and an ordinate entity data, and the relationship table created for each combination of sub-entities to determine the underlying relationship and for displaying an editable cross tab display of a first list along an axis and a second list along an ordinance.

2. The electronic cross tab editor of claim 1, wherein wherein the knowledge base management system is further configured to:

delete, by the instructions to instruct the processor, each pair of sub-entity combinations without an associated relationship symbol knowledge base by the processor.

3. The electronic cross tab editor of claim 2 wherein the associated relationship symbol is associated with the attribute value.

4. The electronic cross tab editor of claim 1, wherein when the reverse editable symbol in the cell is manually deleted by a user and upon a subsequent triggering event being detected, the knowledge base management system is further configured to:

locate, by the instructions to instruct the processor, a row in the relationship table indicated by a pair of sub-entities associated with the cell; and delete the row.

5. The electronic cross tab editor of claim 1, wherein when a second editable symbol is manually added in an empty cell by a user and upon a subsequent triggering event being detected, the knowledge base management system is further configured to:

create, by the instructions to instruct the processor, a row in the relationship table indicated by a pair of sub-entities associated with the cell; and populate, by the instructions to instruct the processor, the row with the second editable symbol.

6. The electronic cross tab editor of claim 3, wherein when a first attribute value is manually updated in the cell to a second attribute value by a user and upon a subsequent triggering event being detected, the knowledge base management system is further configured to:

locate, by the instructions to instruct the processor, a row in the relationship table indicated by a pair of sub-entities associated with the updated cell by the processor; and replace, by the instructions to instruct the processor, the first attribute value in the row with the second attribute value.

7. An apparatus for creating a cross tab display and reverse editing data in a knowledge base memory device, comprising:

programming on a computing device, at least one processor to implement an application for creating the cross tab display and for reverse editing data in the knowledge base memory device hosted by the computing device to:

the at least one processor creating a first list of sub-entities for a first entity;

the at least one processor creating a second list of sub-entities for a second entity;

the at least one processor creating a relationship table of all combinations of each pair of sub-entities from the first list and the second list ,wherein the relationship table is linked to an underlaying table for a particular combination;

the at least one processor rendering an editable cross tab display on an electronic display device that displays the first list, the second list, and the relationship table ,wherein the editable cross tab display displays a cell which comprises: a reverse editable symbol for each particular combination between the first list and the second list in the relationship table;

the at least one processor populating the cell of the relationship table with the reverse editable symbol configured for reverse editing an underlying data table, wherein the reverse editable symbol represents an existence of a relationship defined by common attributes between at least a first sub-entity associated with the cell and a second sub-entity associated with the cell; and the at least one processor performing a reverse editing action to modify an underlying relationship data related to the cell by a manual action to enable the reverse editing action by changing the reverse editable symbol associated with the cell, which in turn changes the underlying relationship data of each associated sub-entity of the underlying data table in the relationship table, wherein a set of underlying relationship tables is associated with each relationship in the relationship table, wherein by the manual action in the underlying relationship table of populating a checkmark in a cell, the underlying relationship data associated with the reverse editable symbol is applied to an appropriate pair of sub-entity combinations associated with the cell resulting in data of the relationship table being changed in accordance with changes of the underlying relationship data of the pair of sub-entity combinations, wherein the changes of the underlying relationship data have been triggered by the manual action of the checkmark in the cell of the relationship table, the reverse editing action further comprising:

retrieving, by the instructions to instruct the processor, the relationship data related to the cell comprising: attribute data by an axis entity data and an ordinate entity data, and the relationship table created for each combination of sub-entities to determine the underlying relationship and for displaying an editable cross tab display of a first list along an axis and a second list along an ordinance.

8. The apparatus of claim 7, wherein each pair of sub-entities without an associated attribute value in the knowledge base memory device is deleted from the cross tab display.

9. The apparatus of claim 7, wherein the reverse editable symbol is associated with an attribute value.

10. The apparatus of claim 7, wherein when the reverse editable symbol in the cell is manually deleted by a user and upon a subsequent triggering event being electronically detected, the apparatus further comprises:

the at least one processor locating a row in the relationship table indicated by a pair of sub-entities associated with the cell; and deleting the row.

11. The apparatus of claim 7, wherein when a second reverse editable symbol is manually added in an empty cell by a user and upon a subsequent triggering event being electronically detected, the apparatus further comprises:

the at least one processor creating a row in the relationship table indicated by a pair of sub-entities associated with the cell; and the at least one processor populating the row with the second reverse editable symbol.

12. The apparatus of claim 9, wherein when a first attribute value is manually updated in the cell to a second attribute value by a user and upon a subsequent triggering event being electronically detected, the apparatus further comprises:

the at least one processor programmed for locating a row in the relationship table indicated by a pair of sub-entities associated with the updated cell; and the at least one processor replacing the first attribute value in the row with the second attribute value.

13. The method of claim 7, wherein, the attribute value for each combination are derived from sensor device output.

14. A system comprising a non-transient computer readable medium (CRM) containing instructions to program at least one processor disposed in a computing device to create a cross tab display and to reverse edits data in a knowledgebase, the system comprising:

the at least one processor programmed for creating a first list of sub-entities for a first entity;

the at least one processor programmed for creating a second list of sub-entities for a second entity;

the at least one processor programmed for creating a relationship table of all combinations of each pair of sub-entities from the first list and the second list;

the at least one processor programmed for rendering an editable cross tab display on an electronic display device that displays the first list, the second list, and the relationship table;

the at least one processor programmed for populating a cell of the relationship table with an reverse editable symbol configured for reverse editing an underlying data table, wherein the reverse editable symbol represents an existence of a relationship defined by common attributes between at least a first sub-entity associated with the cell and a second sub-entity associated with the cell; and the at least one processor programmed for performing a reverse editing action to modify an underlying relationship data related to the cell by a manual action to enable the reverse editing action by changing the reverse editable symbol associated with the cell, which in turn changes the underlying relationship data of each associated sub-entity of the underlying data table in the relationship table, wherein a set of underlying relationship tables is associated with each relationship in the relationship table, wherein by the manual action in the underlying relationship table of populating a checkmark in a cell, the underlying relationship data associated with the reverse editable symbol is applied to an appropriate pair of sub-entity combinations associated with the cell resulting in data of the relationship table being changed in accordance with changes of the underlying relationship data of the pair of sub-entity combinations, wherein the changes of the underlying relationship data have been triggered by the manual action of the checkmark in the cell of the relationship table, the reverse editing action further comprising:

retrieving, by the instructions to instruct the processor, the relationship data related to the cell comprising: attribute data by an axis entity data and an ordinate entity data, and the relationship table created for each combination of sub-entities to determine the underlying relationship and for displaying an editable cross tab display of a first list along an axis and a second list along an ordinance.

15. The system of claim 14, wherein the reverse editable symbol is associated with an attribute value.

16. The system of claim 14, wherein when the reverse editable symbol in the cell is manually deleted by a user and upon a subsequent triggering event being detected, the instructions further comprise:

the at least one processor programmed for locating a row in the relationship table indicated by a pair of sub-entities associated with the cell; and deleting the row.

17. The system of claim 14, wherein when a second editable symbol is manually added in an empty cell by a user and upon a subsequent triggering event being detected, the system further comprise:

the at least one processor programmed for creating a row in the relationship table indicated by a pair of sub-entities associated with the cell; and populating the row with the second editable symbol.

18. The system of claim 15, wherein when a first attribute value is manually updated in the cell to a second attribute value by a user and upon a subsequent triggering event being detected, the system further comprise:

the at least one processor programmed for locating a row in the relationship table indicated by a pair of sub-entities associated with the updated cell; and the at least one processor programmed for replacing the first attribute value in the row with the second attribute value.

19. The system of claim 14 wherein, the attribute values are derived from sensor device output.

* * * * *